US010511598B2

(12) United States Patent
Shanahan et al.

(10) Patent No.: US 10,511,598 B2
(45) Date of Patent: Dec. 17, 2019

(54) TECHNOLOGIES FOR DYNAMIC LOADING OF INTEGRITY PROTECTED MODULES INTO SECURE ENCLAVES

(71) Applicant: Intel Corporation, Santa Clara, CA (US)

(72) Inventors: Mark W. Shanahan, Raleigh, NC (US); Bin Xing, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 15/083,988

(22) Filed: Mar. 29, 2016

(65) Prior Publication Data

US 2017/0289151 A1    Oct. 5, 2017

(51) Int. Cl.
*H04L 29/06* (2006.01)
*G06F 12/14* (2006.01)
*G06F 21/74* (2013.01)
*G06F 12/08* (2016.01)
*G06F 12/0875* (2016.01)

(52) U.S. Cl.
CPC .......... *H04L 63/0876* (2013.01); *G06F 12/08* (2013.01); *G06F 12/0875* (2013.01); *G06F 12/1408* (2013.01); *G06F 21/74* (2013.01); *G06F 2212/1052* (2013.01); *G06F 2212/305* (2013.01); *G06F 2212/402* (2013.01); *H04L 63/123* (2013.01)

(58) Field of Classification Search
USPC ....................................................... 713/170
See application file for complete search history.

(56) References Cited

U.S. PATENT DOCUMENTS 6,931,503 B1 * 8/2005 Robb ...................... G06F 21/80
                                                              711/100
7,315,866 B2 * 1/2008 Wu ......................... G06F 21/64
7,836,387 B1 * 11/2010 Wong ................... H04L 63/123
                                                              714/819

(Continued)

OTHER PUBLICATIONS

International search report for PCT application No. PCT/US2017/019642, dated May 24, 2017 (3 pages).

(Continued)

*Primary Examiner* — Taghi T Arani
*Assistant Examiner* — Badri N Champakesan
(74) *Attorney, Agent, or Firm* — Barnes & Thornburg LLP (57) ABSTRACT

Technologies for dynamic loading of integrity protected modules into a secure enclave include a computing device having a processor with secure enclave support. The computing device divides an executable image into multiple chunks, hashes each of the chunks with corresponding attributes that affect security to generate a corresponding hash value, and generates a hash tree as a function of the hash values. The computing device generates an initial secure enclave memory image that includes the root value of the hash tree. At runtime, the computing device accesses a chunk of the executable image from within the secure enclave, which generates a page fault. In response to the page fault, the secure enclave verifies the associated chunk based on the hash tree and accepts the chunk into the secure enclave in response to successful verification. The root value of the hash tree is integrity-protected. Other embodiments are described and claimed.

19 Claims, 6 Drawing Sheets

(56) References Cited

U.S. PATENT DOCUMENTS

| | | | | |
|---|---|---|---|---|
| 8,266,439 B2* | 9/2012 | Haber | ................ | G06F 21/6254 |
| | | | | 713/150 |
| 8,578,175 B2* | 11/2013 | Boivie | .................... | G06F 21/57 |
| | | | | 713/189 |
| 8,655,919 B2* | 2/2014 | Cachin | .................... | G06F 21/64 |
| | | | | 707/792 |
| 8,805,793 B2* | 8/2014 | Patiejunas | ......... | G06F 16/24554 |
| | | | | 707/687 |
| 9,740,637 B2* | 8/2017 | Chen | .................... | G06F 12/1408 |
| 2008/0133929 A1* | 6/2008 | Gehrmann | ............... | G06F 21/51 |
| | | | | 713/179 |
| 2009/0037491 A1* | 2/2009 | Cachin | .................... | G06F 21/64 |
| 2009/0113136 A1* | 4/2009 | Aharonov | ............... | G06F 21/64 |
| | | | | 711/135 |
| 2009/0113215 A1* | 4/2009 | Aharonov | ............... | G06F 21/64 |
| | | | | 713/189 |
| 2009/0199010 A1* | 8/2009 | Hakuta | ................. | H04L 9/3236 |
| | | | | 713/176 |
| 2011/0283085 A1* | 11/2011 | Dilger | .................... | G06F 11/1004 |
| | | | | 711/216 |
| 2013/0074156 A1* | 3/2013 | Iftode | .................... | G06F 21/52 |
| | | | | 726/3 |
| 2014/0068274 A1* | 3/2014 | Kasatkin | ................. | G06F 21/64 |
| | | | | 713/189 |
| 2015/0121536 A1* | 4/2015 | Xing | ....................... | G06F 21/12 |
| | | | | 726/26 |
| 2015/0186659 A1* | 7/2015 | Leslie-Hurd | ........ | G06F 12/0875 |
| | | | | 726/1 |
| 2015/0227757 A1* | 8/2015 | Bestler | ................ | G06F 21/6227 |
| | | | | 713/167 |
| 2016/0085695 A1* | 3/2016 | Leslie-Hurd | ........ | G06F 12/1441 |
| | | | | 711/163 |

OTHER PUBLICATIONS

Witten opinion for PCT application No. PCT/US2017/019642, dated May 24, 2017 (3 pages).

Prerit Jain et al., 'OpenSGX: An Open Platform for SGX Research', In: The Network and Distributed System Security Symposium 2016. Internet Society, Feb. 21, 2016 (http://www.internetsociety.org/sites/default/files/blogs-media/opensgx-open lplatform-sgx-research.pdf).

Andrew Baumann et al., 'Shielding Applications from an Untrusted Cloud with Haven', In: Proceedings of the 11th USENIX Symposium on Operating Systems Design and Implementation (OSDI), Oct. 6-8, 2014, pp. 267-283. (https://www.usenix.org/system/files/conference/osdil4/osdil14-paper-baumann.f df ).

* cited by examiner

```
HASH *CreateHashTree(int k, int m, CHUNK c[m])
{
    int j = (m - k - 3) / (k - 1);
    HASH *ht = new HASH[j + m];                              ⟵ 308
    for (int i = 0; i < m; i++)
        ht[j + i] = hash(c[i].attributes_affecting_security ||
                         c[i].content);
    while (--j >= 0) {
        int lc = min(j*k + k, m - 1); // last child
        ht[j] = hash(ht[j*k + 1 ... lc]); // all children
    }                                        ⟵ 310
    return ht;
}
```

```
bool LoadChunk(int i, int k, int m, CHUNK c[m], HASH ht[m])
{
    CHUNK chunk = c[i]; // Copies c[i] into enclave memory
    HASH h = hash(chunk.attributes_affecting_security ||
                  chunk.content);

while (i != 0) // i.e. h is not the master hash yet
    {
        int p = (i - 1) / k; // i.e. p is i's parent
        int fc = p*k + 1; // first child of p
        int lc = min(fc + k - 1, m - 1); // last child of p // Hash all children of p, using all intermediate hash
        // values from ht except ht[i], which is substituted
        // with h calculated by LoadChunk() itself
        h = hash(ht[fc ... i - 1] || h || ht[i + 1 ... lc]);
        i = p;
    }

// Return failure if the calculated master hash doesn't
    // match gMasterHash, which is the master hash calculated
    // at build time
    if (gMasterHash != h) return false;

// Relocation applied to the copy in enclave memory
    ApplyRelocation(chunk);

// Move the relocated chunk into its load address
    // relative to gEnclaveBase
    EAcceptCopy(chunk.load_address + gEnclaveBase,
                chunk.content, chunk.size);

// Return success
    return true;
}
```

FIG. 8

TECHNOLOGIES FOR DYNAMIC LOADING OF INTEGRITY PROTECTED MODULES INTO SECURE ENCLAVES

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Secure enclaves provided by SGX were traditionally static in that additional code and/or data could not be added to the secure enclave after the enclave has been finalized (e.g., by executing the EINIT instruction). SGX2 introduces enclave dynamic memory management (EDMM), which includes certain processor instructions that may allow dynamic link libraries (DLLs) or shared objects to be added to an initialized enclave.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
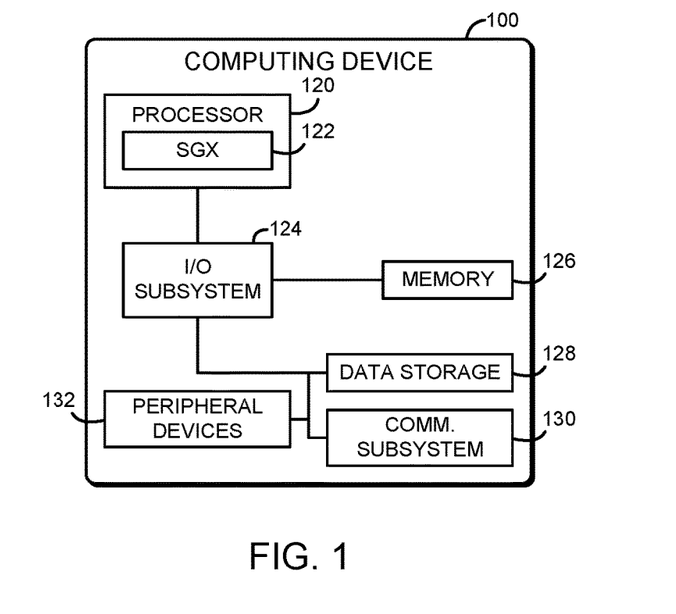
FIG. 1 is a simplified block diagram of at least one embodiment of a computing device for dynamic loading of integrity protected modules into a secure enclave.

Referring now to FIG. 1, in an illustrative embodiment, a computing device 100 for dynamic loading of integrity protected modules includes a processor 120 that supports secure enclaves (e.g., a processor 120 that supports Intel® SGX technology). In use, as described further below, the computing device 100 divides an executable image into multiple chunks, which may be the same size as system memory pages or different sizes. The computing device 100 executes a secure enclave that includes trusted loader code but does not include all of the chunks of the executable image. When the secure enclave attempts to access a chunk, a page fault is generated. In response to the page fault, the secure enclave loads the associated chunk and then verifies that chunk using a hash tree generated from all of the chunks of the executable image. The root of the hash tree—the master hash value—is integrity-protected, for example by being included in the measurement of the secure enclave. Execution of the secure enclave may resume if the chunk is successfully verified. By allowing for dynamic loading of an executable image into a secure enclave, the computing device 100 may reduce pressure on the enclave page cache (EPC) or other resources used to protect the contents of secure enclaves. For example, many applications may use only a small amount of their total code or data, such as a media player that includes multiple codecs but only uses one for a particular media file. Such applications may load chunks associated with the codec in use into the secure enclave on demand. Additionally, the computing device 100 may provide dynamic loading without the complexity associated with traditional dynamic linkers. In particular, the executable image may be statically linked and thus the developer need not divide the application manually into multiple DLLs, shared objects, or other loadable modules. Additionally, the trusted loader of the computing device 100 may be much simpler than a traditional dynamic linker, which may reduce the size of the trusted code base (TCB) of the computing device 100.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes the processor 120, an input/output subsystem 124, a memory 126, a data storage device 128, and communication circuitry 130. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 126. The secure enclave support 122 may be embodied as a set of processor instruction extensions that allows the processor 120 to establish one or more secure enclaves in the memory 126. For example, the secure enclave support 122 may be embodied as Intel® Software Guard Extensions (SGX) technology.

The memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. Additionally, part of the memory 126 may be used as an enclave page cache (EPC) to store encrypted code and/or data for the secure enclaves established by the processor 120. The processor 120 may encrypt memory pages of each secure enclave before transferring the encrypted pages out of the processor 120 to the EPC within the memory 126.

The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. In some embodiments, the data storage device 128 may be used to store one or more executable binary images. Each executable binary image may include code and/or data that is to be initially loaded into a secure enclave and then measured or otherwise verified before the secure enclave is executed.

The communication circuitry 130 of the computing device 100 may be embodied as any communication circuit, device, or collection thereof, capable of enabling communications between the computing device 100 and other remote devices over a network. The communication circuitry 130 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
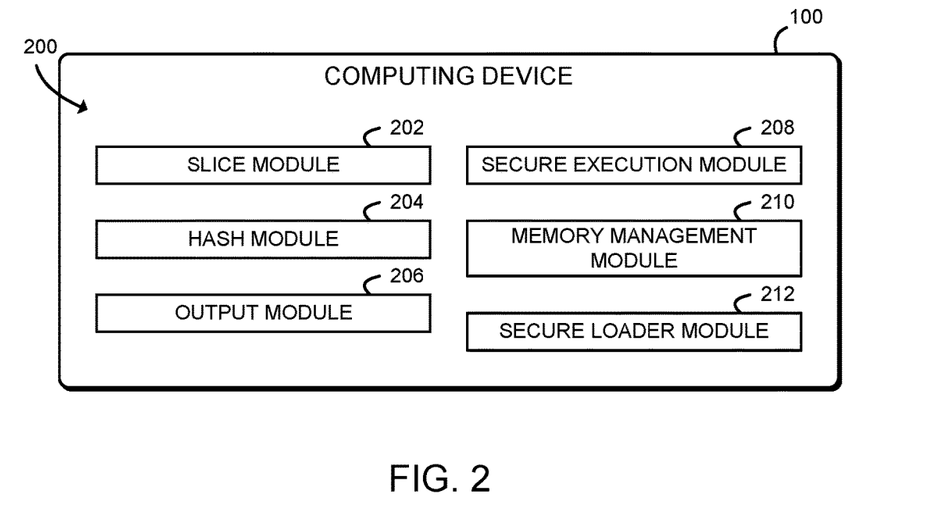
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a slice module 202, a hash module 204, an output module 206, a secure execution module 208, a memory management module 210, and a secure loader module 212. The various modules of the environment 200 may be embodied as hardware, firmware, software, or a combination thereof. As such, in some embodiments, one or more of the modules of the environment 200 may be embodied as circuitry or collection of electrical devices (e.g., slice circuitry 202, hash circuitry 204, output circuitry 206, secure execution circuitry 208, memory management circuitry 210, and/or secure loader circuitry 212). It should be appreciated that, in such embodiments, one or more of the slice circuitry 202, the hash circuitry 204, the output circuitry 206, the secure execution circuitry 208, the memory management circuitry 210, and/or the secure loader circuitry 212 may form a portion of one or more of the processor 120, the I/O subsystem 124, and/or other components of the computing device 100. Additionally, in some embodiments, one or more of the illustrative modules may form a portion of another module and/or one or more of the illustrative modules may be independent of one another.

The slice module 202 is configured to divide an executable image into multiple chunks. Each chunk may include a memory page, a linked module of the executable image, or other subdivision of the executable image. The hash module 204 is configured to hash each of the chunks to generate a corresponding hash value. The hash module 204 may be configured to hash each of the chunks with a corresponding attribute that affects security, such as a corresponding load address of the chunk, page permission of the chunk, or page type of the chunk. The hash module 204 is further configured to generate a hash tree as a function of the hash values corresponding to the chunks. The hash tree includes a multiple leaf nodes and a root value. Each of the leaf nodes corresponds to a hash value corresponding to a chunk. The hash module 204 may be configured to hash each of the chunks and the corresponding attribute with a cryptographic hash function such as the SHA-256 cryptographic hash algorithm. The hash tree may be embodied as a ternary hash tree.

The output module 206 is configured to generate an initial secure enclave memory image for the executable image. The initial secure enclave memory image includes the root value of the hash tree. In some embodiments, the initial secure enclave memory image may include an enclave entry point that is to access one or more chunks of the executable image in response being executed. In some embodiments, the initial secure enclave memory image may include an enclave exception handler that is to verify one or more chunks of the executable image based on the hash tree. In some embodiments, the initial secure enclave memory image may include the hash tree.

The secure execution module 208 is configured to execute an enclave entry point within a secure enclave. The secure enclave is established with the secure enclave support 122 of the processor 120. The enclave entry point is associated with an executable image that is divided into multiple chunks. The secure execution module 208 is further configured to access, in response to execution of the entry point, a chunk of the executable image that is not loaded in the secure enclave. The secure execution module 208 may be further configured to load an initial secure enclave memory image associated with the executable image into the secure enclave. The initial secure enclave memory image may include the root value of the hash tree. In those embodiments, the root value of the hash tree is integrity-protected by the secure enclave.

The memory management module 210 is configured to generate a page fault in response to an access of a chunk of the executable image. The memory management module 210 may be further configured to execute an operating system page fault handler of the computing device 100 in response to generation of the page fault and to invoke an exception handler within the secure enclave in response to execution of the operating system page fault handler. The memory management module 210 may be further configured to determine a location of a chunk in the memory 126 in response to executing the operating system page fault handler. Invoking the exception handler within the secure enclave may include invoking the exception handler with the location of the chunk.

The secure loader module 212 is configured to verify, by the secure enclave in response to generation of the page fault, a chunk of the executable image based on a hash tree. The hash tree includes multiple leaf nodes and a root value. Each of the leaf nodes corresponds to a hash value that corresponds to a chunk of the executable image. The root value of the hash tree is integrity-protected. The secure loader module 212 is further configured to accept the chunk of the executable image into the secure enclave in response to verifying the chunk. The secure loader module 212 may be further configured to copy the chunk to a secure buffer within the secure enclave in response to generation of the page fault. The secure loader module 212 may be further configured to apply relocation to the secure buffer in response to verifying the chunk.

Additionally, although illustrated as being included in the same computing device 100, it should be understood that some or all of the components of the environment 200 may be included in different computing devices 100. For example, in some embodiments the slice module 202, the hash module 204, and the output module 206 may be included in a compiler or other developer computing device 100, and the secure execution module 208, the memory management module 210, and the secure loader computing device 100 may be included in a runtime or other end user computing device 100.

Figure 3:
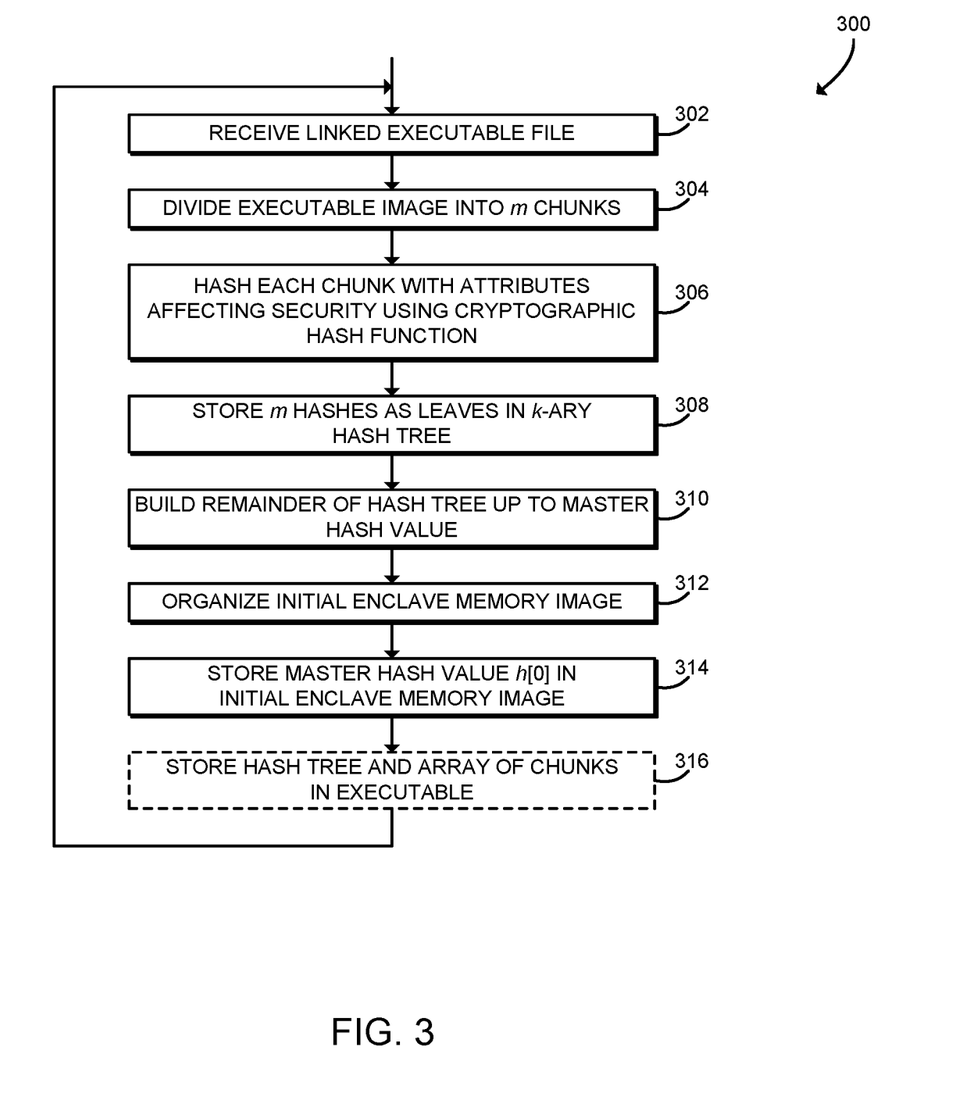
FIG. 3 is a simplified flow diagram of at least one embodiment of a method for preparing a linked executable file that may be executed by the computing device of FIGS. 1-2.

Referring now to FIG. 3, in use, the computing device 100 may execute a method 300 for preparing a linked executable file. The method 300 begins in block 302, in which the computing device 100 receives a linked executable file. The executable file includes an application, static library, shared library, or other executable image that is to be loaded and executed in a secure enclave. The executable file may be embodied as a portable executable (PE) file, an executable and linkable format (ELF) file, or any other executable file. In the illustrative embodiment, the executable file is statically linked; however, in other embodiments the executable file may be dynamically linked.

In block 304, the computing device 100 divides the executable into a number m of chunks. Each chunk may be embodied as a contiguous part of the executable image. Each chunk is also associated with a load address, which may be embodied as an offset from the base address of the secure enclave. Each chunk may also be associated with one or more additional attributes, such as page permissions (e.g., readable, writeable, and/or executable) or SGX page type (e.g., PT_REG, PT_TCS, etc.). As described further below in connection with FIG. 6, at runtime the chunk may be accessed at a virtual address corresponding to the load address. Each chunk may have the same size or different sizes, and the total number m of chunks may be determined based on the chunk size and the size of the executable image. In the illustrative embodiment, each chunk is the size of a 4096-byte memory page. However, in other embodiments, each chunk may be embodied as a linked module of the executable (e.g., a loaded section of a PE format executable and/or a segment of an ELF executable) or any other subdivision of the executable image.

In block 306, the computing device 100 hashes each of the m chunks, concatenated with one or more attributes of the chunk that affect security, using a cryptographic hash function. Thus, the computing device 100 generates m hash values, with each hash value corresponding to a chunk of the executable image. The attributes affecting security may include the load address of the chunk, the page permissions (e.g., readable, writable, and/or executable), the SGX page type (e.g., PT_REG, PT_TCS, etc.), or other attributes affecting security. In the illustrative embodiment, the chunks are hashed using the SHA-256 cryptographic hash algorithm; however, in other embodiments the computing device 100 may use any other appropriate secure hash algorithm.

Figure 6:
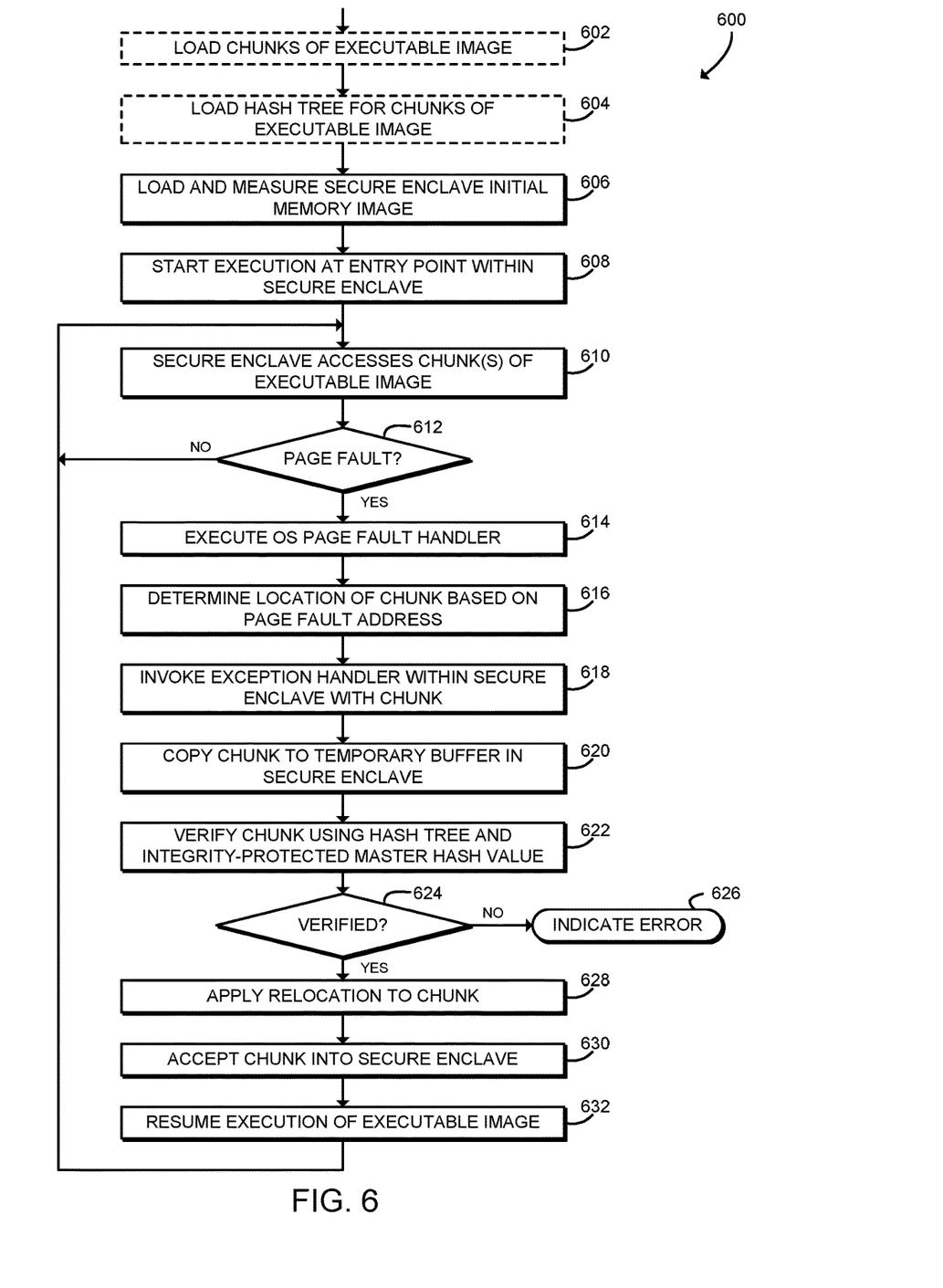
FIG. 6 is a simplified flow diagram of at least one embodiment of a method for dynamic loading of integrity protected modules into a secure enclave that may be executed by the computing device of FIGS. 1-2.

In block 308, the computing device 100 stores the m hashes as leaves in a k-ary hash tree. In block 310, the computing device 100 builds the remainder of the hash tree, up to a master hash value. The hash tree, also known as a Merkle tree, is a data structure in which each parent node includes the hash value of all of its corresponding child nodes. As a k-ary tree, each parent node has at most k child nodes. The root node of the hash tree includes a master hash value that may be used to verify each chunk of the executable image, as described further below in connection with FIG. 6. The hash tree may be embodied as an array ht with $$\frac{m+k-3}{k-1} + m$$

elements. In those embodiments, the element ht[0] is the master hash value (i.e., the root node). Additionally, for all $$1 \leq j < \frac{m+k-3}{k-1} + m,$$

ht[j] has its parent at ht[(j−1)/k]. The hashes of the m chunks (i.e., the leaf nodes) are stored in elements ht[(m+k−3)/(k−1)] . . . ht[(m+k−3)/(k−1)+m−1], respectively.

The value used for k may be dependent on the particular embodiment. To improve performance of hash tree operations, a value of k may be selected based on the block size and output size of the hash function in use to provide a shallower hash tree for a given amount of hash computations. For example, in the illustrative embodiment the SHA-256 hash algorithm has a block size of 512 bits and an output size of 256 bits. Because the SHA-256 algorithm requires a certain number of additional padding bits, the same amount of computational effort is required to hash 512 bits of information (i.e., for k=2) as is required to hash 768 bits of information (k=3). Using the larger value of k (i.e., k=3) provides for a shallower hash tree. Thus, for the SHA-256 hash algorithm, a k-ary hash tree with k=3 (i.e., a ternary hash tree) may provide optimal performance.

In block 312, the computing device 100 organizes an initial secure enclave memory image. At runtime, the initial secure enclave memory image will be loaded into the secure enclave, measured, and thus verified using the secure enclave support 122 of the processor 120. Therefore, secure enclave memory usage may be reduced and performance may be increased by reducing the size of the initial secure enclave memory image. As described further below, the initial secure enclave memory image includes an enclave entry point, which may be embodied as a main function or other code that is to be executed when the secure enclave is initially started. The enclave entry point is responsible for calling trusted loader code to load and verify chunks of the executable as the chunks are needed. The initial secure enclave memory image also includes storage space for the master hash value h[0] of the hash tree. For example, the initial secure enclave memory image may include space for a global variable to store the master hash value. In some embodiments, the initial secure enclave memory image may include other components, such as an executable file header, relocation records, exception handlers, or other code or data needed to dynamically load other chunks of the executable image. The components of the initial secure enclave memory image may be grouped into a module of the executable image such as a loaded section of a PE format executable and/or a segment of an ELF executable. The initial secure enclave memory image may be identified using one or more compiler directives.

In block 314, the computing device 100 stores the master hash value h[0] in the initial secure enclave memory image. By being included in the initial secure enclave memory image, the master hash value is measured (e.g., included in the MRENCLAVE measurement of the secure enclave) and thereby integrity-protected. Because the master hash value is integrity protected, the chunks of the application executable may be securely verified using the hash tree even if the other elements of the hash tree are not included in the secure enclave or otherwise integrity protected. Additionally, although illustrated as being included in the initial secure enclave memory image, it should be understood that in some embodiments the master hash value may be integrity-protected using any other appropriate technique. For example, in some embodiments the master hash value may be provided to the computing device 100 by a trusted remote server.

In some embodiments, in block 316 the computing device 100 stores the remainder of the hash tree and an array of the chunks in the executable file. If the hash tree and/or the array of chunks are not stored in the executable file, they may be regenerated at runtime by the computing device 100. Thus, in some embodiments rather than storing an array of chunks, the computing device 100 may store sufficient information in the executable file to allow the computing device 100 to correctly divide the executable image into chunks at runtime. Additionally or alternatively, in some embodiments the computing device 100 may perform additional processing on the chunks prior to storing them in the executable file. For example, in some embodiments the computing device 100 may encrypt the chunks of the executable image prior to storing them in the executable file. After processing the executable file, the method 300 loops back to block 302, in which the computing device 100 may process additional executable files.

Although illustrated as processing a statically linked executable file, it should be understood that the same techniques may also apply to dynamically linked executables and libraries. To support dynamic linking, master hash values for all linked dynamic libraries may be stored in the initial secure enclave memory image. Additionally or alternatively, in some embodiments the master hash values for linked dynamic libraries may be loaded from one or more chunks whose master hash value is stored in the initial secure enclave memory image.

Figure 4:
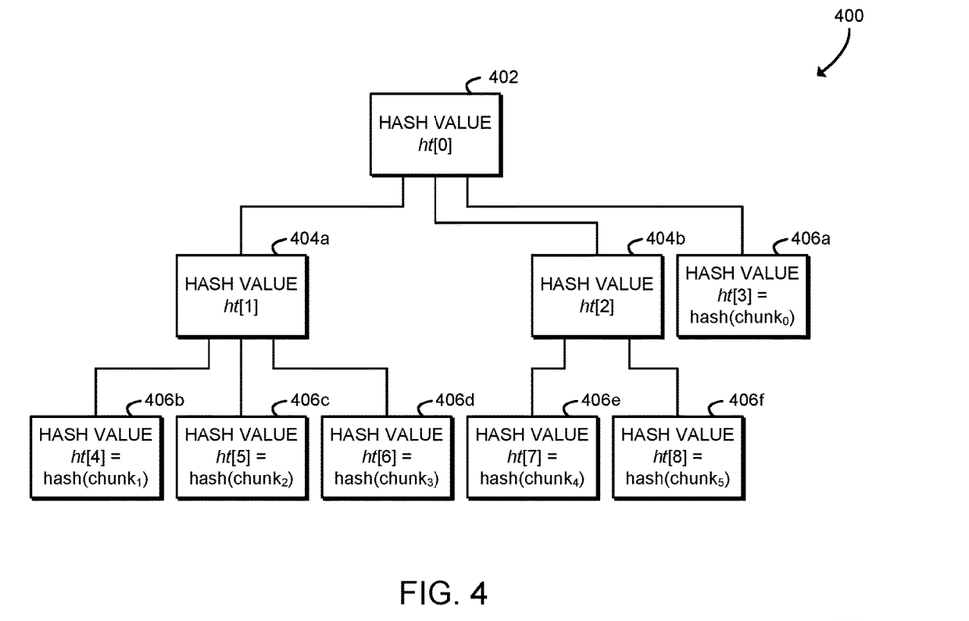
FIG. 4 is a schematic diagram illustrating a hash tree that may be processed by the computing device of FIGS. 1-2.

Referring now to FIG. 4, a schematic diagram 400 illustrates one potential embodiment of a hash tree ht that may be generated for an executable image. In the illustrative example, the value of m is six; that is, the executable image is divided into six chunks labeled $chunk_0$ through $chunk_5$. As shown, the value of k is three; that is, the hash tree ht is a ternary hash tree. The hash tree ht includes a root node 402 that includes the master hash value ht[0], two parent nodes 404a, 404b, and six leaf nodes 406a through 406f. As shown, each of the leaf nodes 406a through 406f includes a hash value corresponding to one of the chunks of the executable image. For example, leaf node 406a includes hash value ht[3] corresponding to $chunk_0$, leaf node 406b includes hash value ht[4] corresponding to $chunk_1$, and so on. Parent node 404a includes a hash value ht[1] corresponding to a hash of nodes 406b, 406c, 406d, and parent node 404b includes a hash value ht[2] corresponding to a hash of nodes 406e, 406f. Root node 402 includes the master hash value ht[0] corresponding to a hash of nodes 404a, 404b, 406a. As described above, the master hash value ht[0] may be integrity-protected by being included in an initial secure enclave memory image. It should be understood that the computing device 100 may use any technique for constructing the hash tree; however, constructing a balanced tree as shown may yield the best performance in typical cases.

Figure 5:
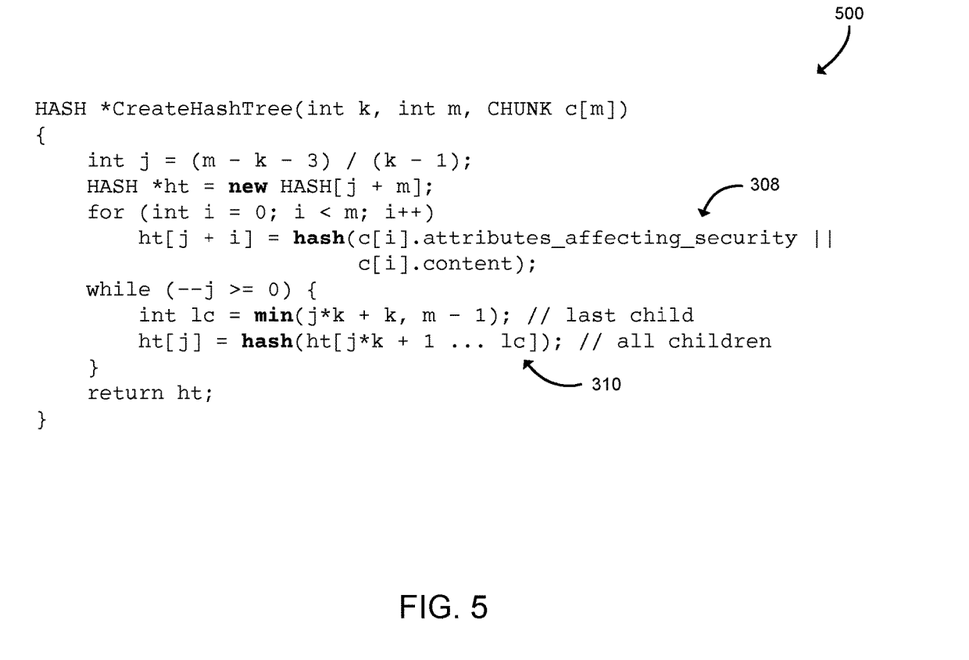
FIG. 5 is pseudocode illustrating one potential embodiment of method for creating a hash tree that may be executed by the computing device of FIGS. 1-2.

Referring now to FIG. 5, pseudocode 500 illustrates one potential embodiment of a routine for creating a hash tree ht. As shown, the pseudocode 500 includes a function CreateHashTree(int k, int m, CHUNK c[m]) that may be invoked to generate the hash tree ht. The parameter k indicates the maximum number of child nodes for the hash tree, the parameter m indicates the number of chunks in the executable image, and the parameter c identifies an array of chunks in memory. As shown, the pseudocode 500 performs operations similar to those described above in connection with blocks 308, 310 of FIG. 3.

Referring now to FIG. 6, in use, the computing device 100 may execute a method 600 for dynamically loading an integrity-protected module into a secure enclave. The method 600 begins in block 602, in which the computing device 100 may, in some embodiments, load the chunks of an executable image. The executable image may be embodied as any executable image processed to support dynamic loading of chunks as described above in connection with FIG. 3. The computing device 100 may load the chunks into an array stored in an unprotected part of the memory 126 (i.e., outside of any secure enclave). As described above in connection with block 316 of FIG. 3, in some embodiments the associated executable file may include an array of chunks that may be loaded into the memory 126, or the executable file may include information to allow the computing device 100 to divide the executable image into chunks.

In block 604, in some embodiments the computing device 100 may load a hash tree ht based on the chunks of the executable image. After being loaded, the hash tree ht may be stored in an unprotected part of the memory 126 (i.e., outside of any secure enclave). As described above in connection with block 316 of FIG. 3, in some embodiments the associated executable file may include a hash tree that may be loaded into the memory 126. In some embodiments, the computing device 100 may generate the hash tree ht at runtime based on the chunks of the executable image, using an algorithm as described above in connection with blocks 308, 310 of FIG. 3.

Although illustrated as loading the chunks of the executable image and loading the hash tree prior to executing the executable image, it should be understood that in some embodiments the functions of blocks 602, 604 may be performed at different times. For example, in some embodiments the computing device 100 may load one or more chunks of the executable image and/or load part or all of the hash tree from the data storage device 128 on-demand, such as in response to a page fault. The computing device 100 may load the appropriate chunk and part of the hash tree prior to determining the location of the chunk in memory as described further below in connection with block 616.

In block 606, the computing device 100 loads and measures the initial secure enclave memory image of the executable into a secure enclave in the memory 126. Loading and measuring the initial secure enclave memory image cryptographically verifies the integrity of the initial secure enclave memory image. As described above, the initial secure enclave memory image may include an enclave entry point and a master hash value of the hash tree ht, as well as other components such as a file header, relocation records, a trusted loader, exception handlers, or other components. An untrusted secure enclave runtime of the computing device 100 may recognize the initial secure enclave memory image in the executable (e.g., by recognizing a particular loaded section or segment of the executable) and then load that initial secure enclave memory image into the secure enclave. The secure enclave may also include virtual memory space associated with the chunks of the executable, but the contents of the chunks are not loaded into the secure enclave (and therefore are also not measured). To load and measure the initial secure enclave memory image, the computing device 100 may use one or more specialized instructions provided by the secure enclave support 122 of the processor 120. For example, the computing device 100 may load memory pages into the secure enclave and then extend a cryptographic hash measurement to those memory pages. After being loaded, the computing device 100 may finalize the secure enclave to prepare it for execution.

In block 608, the computing device 100 starts execution at the enclave entry point within the secure enclave. The enclave entry point may be embodied as a main function or other code of the initial secure enclave memory image that is to be executed when the secure enclave is initially started. The computing device 100 continues to execute code from within the secure enclave. The processor 120 may execute code in a secure enclave mode, which protects code and data from being accessed by software executing outside of the secure enclave.

In block 610, the computing device 100, executing within the secure enclave, accesses one or more chunks of the executable image. The computing device 100 may access the chunks by reading, writing, executing, or otherwise accessing a virtual memory location within the secure enclave that is assigned to a chunk of the executable image. If the chunk has been loaded into the secure enclave, the memory access may be successful and execution of the executable image may continue. If the chunk has not been loaded into the secure enclave, the access may cause the processor 120 to generate a page fault. In block 612, the computing device 100 determines whether a page fault has occurred. If not, the method 600 loops back to block 610 to continue accessing chunks of the executable image. If a page fault has occurred, the method 600 advances to block 614.

In block 614, the computing device 100 executes an operating system page fault handler of the computing device 100 in response to the page fault. The memory address associated with the page fault may be provided to the page fault handler, for example by being stored in a register of the processor 120 such as the CR2 register. In some embodiments, to protect confidentiality of the secure enclave, the CR2 register may identify the memory page associated with the page fault but the particular offset of the faulting address within that page may be cleared or otherwise omitted by the processor 120. In some embodiments, the operating system page fault handler may pre-add memory pages the secure enclave for the chunk, for example by executing the EAUG instruction. Those pre-added memory pages are added in a pending state and may not be accessed by the secure enclave until after the secure enclave has accepted the memory pages into the secure enclave.

In block 616, the computing device 100 locates the missing chunk of the executable image based on the page fault address. In particular, the computing device 100 may identify the memory address, size, and content of the chunk that was accessed by the secure enclave as described above in connection with block 610. In embodiments in which each page is a chunk, the chunk address may be the same as the page fault address (or directly mapped from the page fault address), and the chunk size may be fixed at the page size. For embodiments with variable chunk sizes, each chunk may be encoded with its content and other page-specific information that affects security, such as permissions (e.g., read, write, and/or execute), SGX page types (e.g., PT_REG, PT_TCS, etc.), load address, or other attributes. For example, each chunk may be described as a tuple including {address, size, content}, and all of the tuples may be sorted by address. The computing device 100 may perform a binary search of the sorted tuples to translate a page fault address into the chunk containing the missing page. Alternatively, a hash table may be employed to map page addresses into chunks. Since the chunks are static (i.e., created at build time), the hash function may be fine-tuned to avoid collisions (e.g., using the "Perfect Hash" technique) completely. In the illustrative embodiment, the operating system page fault handler injects a fault/signal to the faulting application (i.e., the unprotected host application of the secure enclave) and the exception handler of the application identifies the missing chunk. Additionally or alternatively, in some embodiments the operating system page fault handler itself may identify the missing chunk.

In block 618, the computing device 100 invokes an exception handler within the secure enclave with the missing chunk. The computing device 100 may pass the chunk (including the size, address, and/or content of the chunk) as a parameter to the exception handler. The computing device 100 may also provide the hash tree ht to the exception handler, for example by providing the address of the hash tree ht as a parameter. The computing device 100 may also provide additional information to the enclave exception handler such as the number of chunks m of the executable image or the maximum number k of child nodes for the hash tree ht.

In block 620, the computing device 100 copies the contents of the chunk to a temporary buffer in the secure enclave. The computing device 100 may copy the contents of the chunk from within an exception handler or other routine executed within the secure enclave. In some embodiments, the computing device 100 may perform additional processing on the chunk prior to copying the contents to the temporary buffer in the secure enclave. For example, in some embodiments the computing device 100 may decrypt the contents of the chunk.

In block 622, the computing device 100 verifies the chunk using the hash tree ht and the integrity-protected master hash value ht[0] of the hash tree ht. The computing device 100 may hash the chunk concatenated with the associated attributes affecting security of the chunk using a cryptographic hash function, similar to the operation described above in connection with block 306 of FIG. 3. In the illustrative embodiment, the chunk is hashed using the SHA-256 cryptographic hash algorithm; however, in other embodiments the computing device 100 may use any other appropriate secure hash algorithm. After calculating the hash value for the chunk to be verified, the computing device 100 calculates hash values for the parent nodes of the chunk to be verified, up to the root node. The computing device 100 may calculate the hash values for the parent nodes using an algorithm similar to that described above in connection with block 310 of FIG. 3. In particular, the computing device 100 may use hash values from the hash tree ht for chunks other than the chunk to be verified. After calculating a hash value for the root node, the computing device 100 compares the calculated value to the integrity-protected master hash value. The computing device 100 may, for example, compare the calculated value to a global variable containing the master hash value that was included in the initial secure enclave memory image as described above in connection with block 314 of FIG. 3. In those embodiments, the master hash value is integrity-protected by being included in the initial secure enclave memory image and thereby being included in the secure enclave measurement.

In block 624, the computing device 100 determines whether the chunk was successfully verified. The computing device 100 may determine, for example, whether the calculated hash tree root value matches the integrity-protected master hash value. If not, the method 600 branches to block 626, in which the computing device 100 indicates an error. The computing device 100 may, for example, terminate the application that includes the secure enclave, report to a user that the enclave has failed verification, log an error, or generate any other appropriate security response. Referring back to block 624, if the chunk is successfully verified, the method 600 advances to block 628.

In block 628, the computing device 100 applies relocation to the chunk. The computing device 100 may perform any appropriate relocation operation, including updating addresses and/or symbols included in the chunk. After relocation, in block 630 the computing device 100 accepts the chunk into the secure enclave. Accepting the chunk into the secure enclave allows the secure enclave to successfully access the contents the chunk, for example by performing memory read, write, or execution operations on addresses within the chunk. As part of accepting the chunk, the computing device 100 may copy the contents of the chunk from the temporary buffer to the associated load address within the secure enclave. To accept the chunk, the computing device 100 may execute one or more instructions provided by the secure enclave support 122 of the processor 120. For example, the computing device 100 may execute an EACCEPT instruction or an EACCEPTCOPY instruction to accept the chunk into the secure enclave. In some embodiments, if the operating system has not yet added the memory pages of the chunk to the secure enclave, the EACCEPT and/or EACCEPTCOPY instruction may generate an additional page fault, and in response the operating system may add memory pages of the chunk to the secure enclave, for example by executing the EAUG instruction.

In block 632, the computing device 100 resumes execution of the executable image within the secure enclave. In particular, the computing device 100 may resume execution at the original instruction that generated the page fault as described above in connection with block 610. After accepting the chunk into the secure enclave, that instruction may succeed and execution of the executable image may continue. After resuming execution, the method 600 loops back to block 610, in which the secure enclave continues to access chunks of the executable image.

Figure 7:
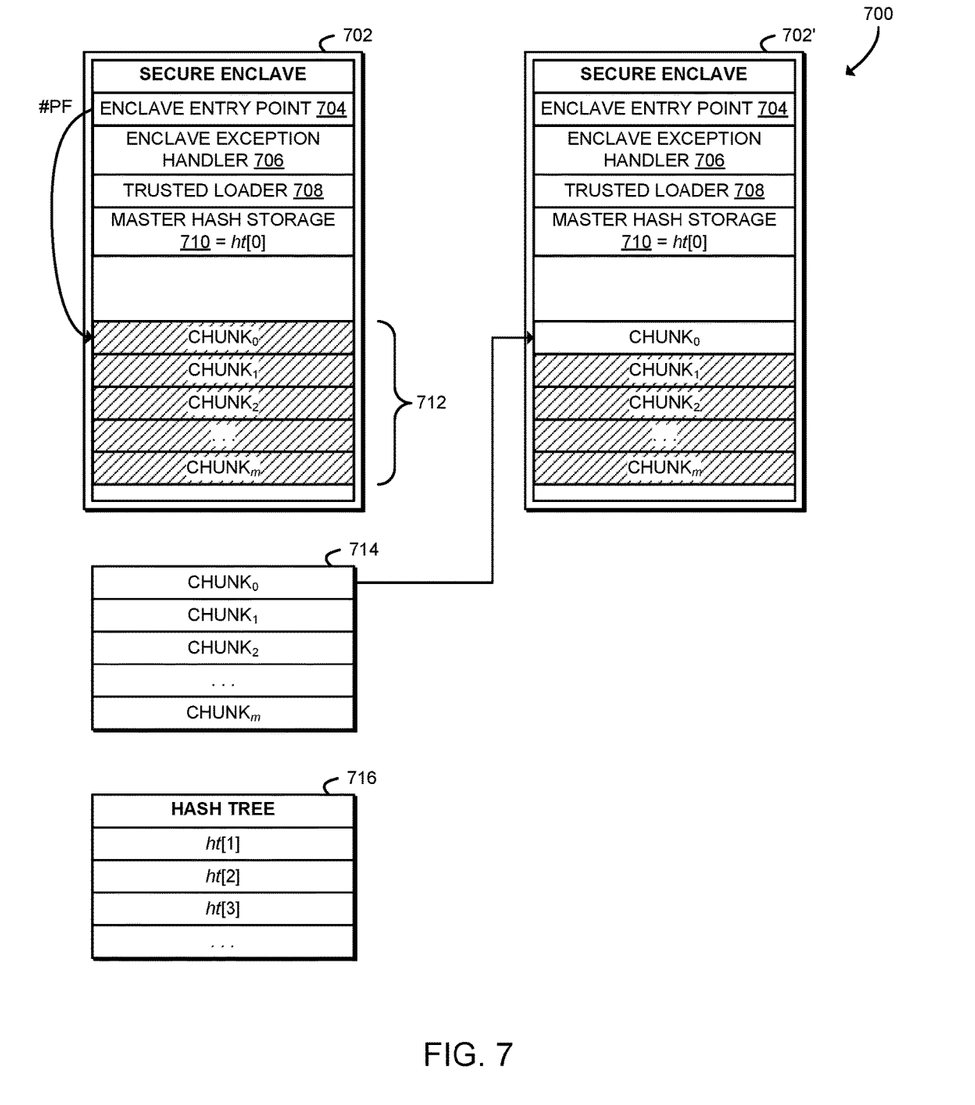
FIG. 7 is a schematic diagram illustrating at least one embodiment of a secure enclave that may be established by the computing device of FIGS. 1-2.

Referring now to FIG. 7, schematic diagram 700 illustrates at least one embodiment of the secure enclave established by the computing device 100. The diagram 700 shows the secure enclave 702 after it has been loaded and measured. After being loaded, the secure enclave 702 includes the contents of the initial secure enclave memory image. Illustratively, the initial secure enclave memory image includes an enclave entry point 704, an enclave exception handler 706, a trusted loader 708, and master hash storage 710. The master hash storage 710 includes the root value of the hash tree ht[0] and is integrity-protected by the secure enclave 702. The secure enclave 702 also includes virtual memory space 712 dedicated to the m chunks of the executable image. However, in the illustrative embodiment, none of the chunks are initially loaded into the secure enclave 702 or measured.

As described above, at runtime the computing device 100 may start execution of the secure enclave 702 at the enclave entry point 704. Illustratively, the enclave entry point 704 attempts to access $chunk_0$ and, as a result, generates a page fault #PF. In response to the page fault, the contents of $chunk_0$ are copied from an array 714 of chunks into the secure enclave 702 and verified using the hash tree 716 and the master hash storage 710. The chunk0 may be copied and/or verified by the secure enclave 702 using the enclave exception handler 706 and/or the trusted loader 708. In the illustrative embodiment, the array 714 of chunks and the hash tree 716 are stored in an unsecured part of the memory 126. However, in other embodiments the computing device 100 may use any other technique to provide $chunk_0$ and the hash tree 716 to the secure enclave 702. After verifying $chunk_0$, the secure enclave 702' may access the contents of $chunk_0$.

Figure 8:
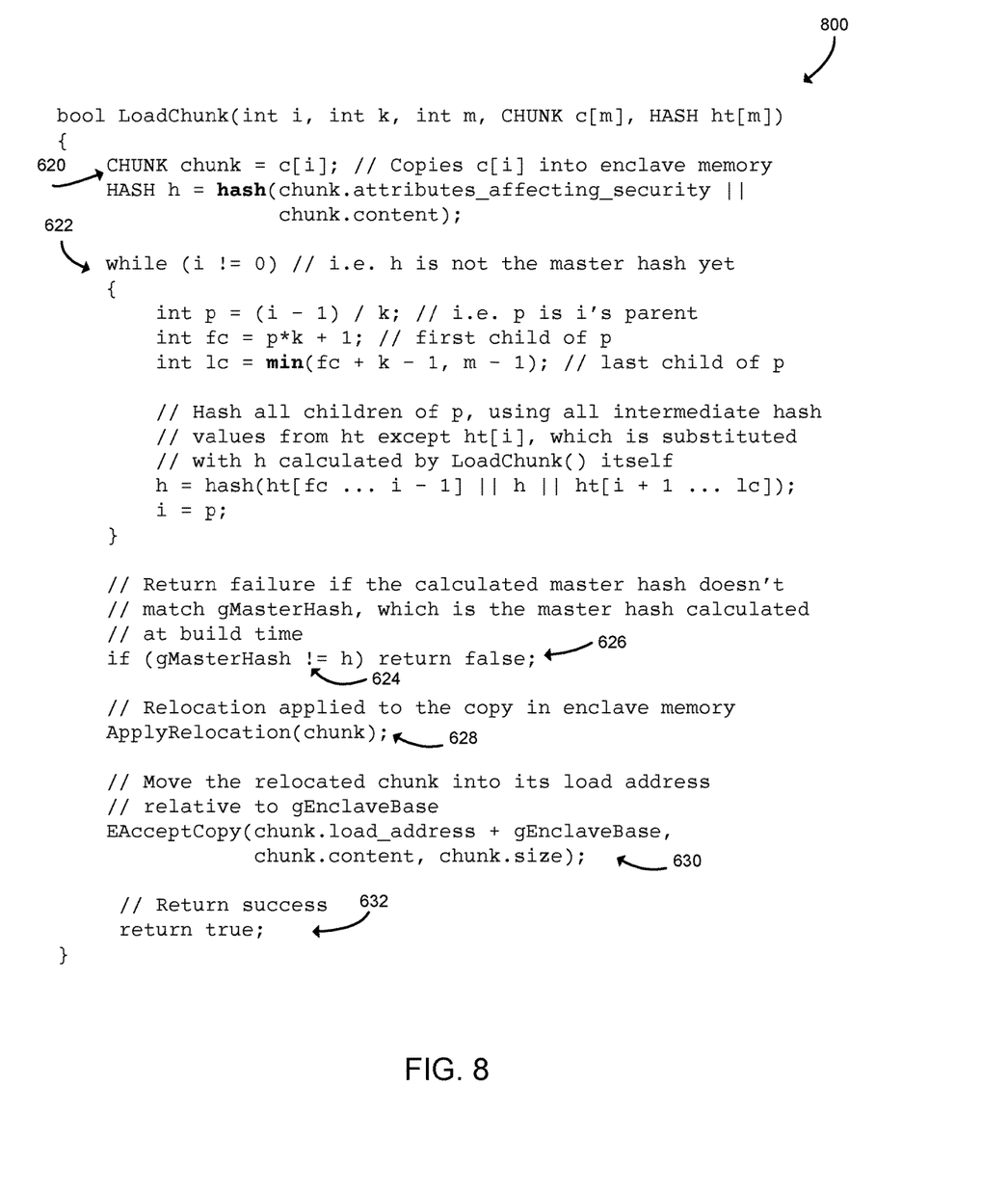
FIG. 8 pseudocode illustrating one potential embodiment of method for dynamic loading of integrity protected modules into a secure enclave that may be executed by the computing device of FIGS. 1-2.

Referring now to FIG. 8, pseudocode 800 illustrates one potential embodiment of a routine for loading an integrity protected chunk into a secure enclave. As shown, the pseudocode 800 includes a function LoadChunk(int i, int k, int m, CHUNK c[m], HASH ht[m]) that may be invoked by a secure enclave to load a chunk into the secure enclave. The parameter i identifies the index of the chunk to be loaded and verified, the parameter k indicates the maximum number of child nodes for the hash tree, the parameter m indicates the number of chunks in the executable image, the parameter c identifies an array of chunks in memory, and the parameter ht identifies the hash tree. As shown, the pseudocode 800 performs operations similar to those described above in connection with blocks 620, 622, 624, 626, 628, 630, 632 of FIG. 6. In some embodiments, executable code for the LoadChunk routine may be included in the initial secure enclave memory image, for example as part of the enclave exception handler 706 and/or the trusted loader 708 of FIG. 7.

It should be appreciated that, in some embodiments, any one or more of the methods 300 and/or 600 may be embodied as various instructions stored on a computer-readable media, which may be executed by the processor 120, the I/O subsystem 124, and/or other components of the computing device 100 to cause the computing device 100 to perform the respective method 300 and/or 600. The computer-readable media may be embodied as any type of media capable of being read by the computing device 100 including, but not limited to, the memory 126, the data storage device 128, firmware devices, other memory or data storage devices of the computing device 100, portable media readable by a peripheral device 132 of the computing device 100, and/or other media.

EXAMPLES

Illustrative examples of the technologies disclosed herein are provided below. An embodiment of the technologies may include any one or more, and any combination of, the examples described below.

Example 1 includes a computing device for secure enclave execution, the computing device comprising a secure execution module to (i) execute an enclave entry point within a secure enclave, wherein the secure enclave is established with secure enclave support of a processor of the computing device, and wherein the enclave entry point is associated with an executable image that is divided into a plurality of chunks, and (ii) access, in response to execution of the entry point, a first chunk of the executable image, wherein the first chunk is not loaded in the secure enclave; a memory management module to generate a page fault in response to an access of the first chunk of the executable image; and a secure loader module to (i) verify, by the secure enclave in response to generation of the page fault, the first chunk based on a hash tree, wherein the hash tree includes a plurality of leaf nodes and a root value, wherein each of the plurality of leaf nodes corresponds to a hash value corresponding to a chunk of the executable image, and wherein the root value is integrity-protected, and (ii) accept the first chunk of the executable image into the secure enclave in response to verification of the first chunk.

Example 2 includes the subject matter of Example 1, and wherein each of the plurality of chunks comprises a memory page.

Example 3 includes the subject matter of any of Examples 1 and 2, and wherein each of the plurality of chunks comprises a linked module of the executable image.

Example 4 includes the subject matter of any of Examples 1-3, and wherein to verify the first chunk based on the hash tree comprises to hash the first chunk with a corresponding attribute that affects security to generate a first hash value; determine a test root value as a function of the hash tree and the first hash value; and compare the test root value to the root value of the hash tree.

Example 5 includes the subject matter of any of Examples 1-4, and wherein to hash the first chunk with the corresponding attribute comprises to hash the first chunk and the corresponding attribute with a cryptographic hash function.

Example 6 includes the subject matter of any of Examples 1-5, and wherein the cryptographic hash function comprises a SHA-256 cryptographic hash algorithm, and wherein the hash tree comprises a ternary hash tree.

Example 7 includes the subject matter of any of Examples 1-6, and wherein the corresponding attribute that affects security comprises a load address of the first chunk, a page permission of the first chunk, or a page type of the first chunk.

Example 8 includes the subject matter of any of Examples 1-7, and wherein the secure execution module is further to load an initial secure enclave memory image associated with the executable image into the secure enclave, wherein the initial secure enclave memory image includes the root value of the hash tree, and wherein the root value of the hash tree is integrity-protected by the secure enclave.

Example 9 includes the subject matter of any of Examples 1-8, and wherein the initial secure enclave memory image includes the enclave entry point.

Example 10 includes the subject matter of any of Examples 1-9, and wherein the memory management module is further to (i) execute an operating system page fault handler of the computing device in response to generation of the page fault and (ii) invoke an exception handler within the secure enclave in response to execution of the operating system page fault handler; wherein to verify the first chunk based on the hash tree comprises to verify the first chunk based on the hash tree in response to invocation of the exception handler within the secure enclave.

Example 11 includes the subject matter of any of Examples 1-10, and wherein the memory management module is further to determine a location of the first chunk in response to execution of the operating system page fault handler; wherein to invoke the exception handler comprises to invoke the exception handler with the location of the first chunk.

Example 12 includes the subject matter of any of Examples 1-11, and wherein the secure loader module is further to copy the first chunk to a secure buffer within the secure enclave in response to generation of the page fault; wherein to verify the first chunk based on the hash tree comprises to verify the first chunk in response to copying of the first chunk to the secure buffer.

Example 13 includes the subject matter of any of Examples 1-12, and wherein the secure loader module is further to apply relocation to the secure buffer in response to verification of the first chunk.

Example 14 includes the subject matter of any of Examples 1-13, and wherein to accept the first chunk of the executable image comprises to copy the secure buffer to a corresponding load address within the secure enclave.

Example 15 includes a computing device for secure enclave generation, the computing device comprising a slice module to divide an executable image into a plurality of chunks; a hash module to (i) hash each of the plurality of chunks to generate a corresponding hash value and (ii) generate a hash tree as a function of the plurality of hash values corresponding to the plurality of chunks, wherein the hash tree includes a plurality of leaf nodes and a root value, and wherein each of the plurality of leaf nodes corresponds to a hash value corresponding to a chunk; and an output module to generate an initial secure enclave memory image for the executable image, wherein the initial secure enclave memory image includes the root value of the hash tree.

Example 16 includes the subject matter of Example 15, and wherein each of the plurality of chunks comprises a memory page.

Example 17 includes the subject matter of any of Examples 15 and 16, and wherein each of the plurality of chunks comprises a linked module of the executable image.

Example 18 includes the subject matter of any of Examples 15-17, and wherein to hash each of the plurality of chunks comprises to hash each of the plurality of chunks with a corresponding attribute that affects security.

Example 19 includes the subject matter of any of Examples 15-18, and wherein to hash each of the plurality of chunks with the corresponding attribute comprises to hash each of the plurality of chunks and the corresponding attribute with a cryptographic hash function.

Example 20 includes the subject matter of any of Examples 15-19, and wherein the cryptographic hash function comprises a SHA-256 cryptographic hash algorithm, and wherein the hash tree comprises a ternary hash tree.

Example 21 includes the subject matter of any of Examples 15-20, and wherein the corresponding attribute comprises a corresponding load address, a corresponding page permission, or a corresponding page type.

Example 22 includes the subject matter of any of Examples 15-21, and wherein to generate the initial secure enclave memory image comprises to generate an initial secure enclave memory image that includes the hash tree.

Example 23 includes the subject matter of any of Examples 15-22, and wherein to generate the initial secure enclave memory image comprises to generate an initial secure enclave memory image that includes an enclave entry point, wherein the enclave entry point is to access a first chunk of the plurality of chunks in response to execution of the enclave entry point.

Example 24 includes the subject matter of any of Examples 15-23, and wherein to generate the initial secure enclave memory image comprises to generate an initial secure enclave memory image that includes an enclave exception handler, wherein the enclave exception handler is to verify a first chunk of the plurality of chunks based on the hash tree.

Example 25 includes a method for secure enclave execution, the method comprising executing, by a computing device, an enclave entry point within a secure enclave, wherein the secure enclave is established with secure enclave support of a processor of the computing device, and wherein the enclave entry point is associated with an executable image that is divided into a plurality of chunks; accessing, by the computing device in response to executing the enclave entry point, a first chunk of the executable image, wherein the first chunk is not loaded in the secure enclave; generating, by the computing device, a page fault in response to accessing the first chunk of the executable image; verifying, by the secure enclave in response to generating the page fault, the first chunk based on a hash tree, wherein the hash tree includes a plurality of leaf nodes and a root value, wherein each of the plurality of leaf nodes corresponds to a hash value corresponding to a chunk of the executable image, and wherein the root value is integrity-protected; and accepting, by the computing device, the first chunk of the executable image into the secure enclave in response to verifying the first chunk.

Example 26 includes the subject matter of Example 25, and wherein each of the plurality of chunks comprises a memory page.

Example 27 includes the subject matter of any of Examples 25 and 26, and wherein each of the plurality of chunks comprises a linked module of the executable image.

Example 28 includes the subject matter of any of Examples 25-27, and wherein verifying the first chunk based on the hash tree comprises hashing the first chunk with a corresponding attribute that affects security to generate a first hash value; determining a test root value as a function of the hash tree and the first hash value; and comparing the test root value to the root value of the hash tree.

Example 29 includes the subject matter of any of Examples 25-28, and wherein hashing the first chunk with the corresponding attribute comprises hashing the first chunk with the corresponding attribute using a cryptographic hash function.

Example 30 includes the subject matter of any of Examples 25-29, and wherein the cryptographic hash function comprises a SHA-256 cryptographic hash algorithm, and wherein the hash tree comprises a ternary hash tree.

Example 31 includes the subject matter of any of Examples 25-30, and wherein hashing the first chunk with the corresponding attribute that affects security comprises hashing the first chunk with a load address of the first chunk, a page permission of the first chunk, or a page type of the first chunk.

Example 32 includes the subject matter of any of Examples 25-31, and further comprising loading, by the computing device, an initial secure enclave memory image associated with the executable image into the secure enclave, wherein the initial secure enclave memory image includes the root value of the hash tree, and wherein the root value of the hash tree is integrity-protected by the secure enclave.

Example 33 includes the subject matter of any of Examples 25-32, and wherein the initial secure enclave memory image includes the enclave entry point.

Example 34 includes the subject matter of any of Examples 25-33, and further comprising executing, by the computing device, an operating system page fault handler of the computing device in response to generating the page fault; and invoking, by the computing device, an exception handler within the secure enclave in response to executing the operating system page fault handler; wherein verifying the first chunk based on the hash tree comprises verifying the first chunk based on the hash tree in response to invoking the exception handler within the secure enclave.

Example 35 includes the subject matter of any of Examples 25-34, and further comprising determining, by the computing device, a location of the first chunk in response to executing the operating system page fault handler; wherein invoking the exception handler comprises invoking the exception handler with the location of the first chunk.

Example 36 includes the subject matter of any of Examples 25-35, and further comprising copying, by the computing device, the first chunk to a secure buffer within the secure enclave in response to generating the page fault; wherein verifying the first chunk based on the hash tree comprises verifying the first chunk in response to copying the first chunk to the secure buffer.

Example 37 includes the subject matter of any of Examples 25-36, and further comprising applying, by the computing device, relocation to the secure buffer in response to verifying the first chunk.

Example 38 includes the subject matter of any of Examples 25-37, and wherein accepting the first chunk of the executable image comprises copying the secure buffer to a corresponding load address within the secure enclave.

Example 39 includes a method for secure enclave generation, the method comprising dividing, by a computing device, an executable image into a plurality of chunks; hashing, by the computing device, each of the plurality of chunks to generate a corresponding hash value; generating, by the computing device, a hash tree as a function of the plurality of hash values corresponding to the plurality of chunks, wherein the hash tree includes a plurality of leaf nodes and a root value, and wherein each of the plurality of leaf nodes corresponds to a hash value corresponding to a chunk; and generating, by the computing device, an initial secure enclave memory image for the executable image, wherein the initial secure enclave memory image includes the root value of the hash tree.

Example 40 includes the subject matter of Example 39, and wherein each of the plurality of chunks comprises a memory page.

Example 41 includes the subject matter of any of Examples 39 and 40, and wherein each of the plurality of chunks comprises a linked module of the executable image.

Example 42 includes the subject matter of any of Examples 39-41, and wherein hashing each of the plurality of chunks comprises hashing each of the plurality of chunks with a corresponding attribute that affects security.

Example 43 includes the subject matter of any of Examples 39-42, and wherein hashing each of the plurality of chunks with the corresponding attribute comprises hashing each of the plurality of chunks with the corresponding attribute using a cryptographic hash function.

Example 44 includes the subject matter of any of Examples 39-43, and wherein the cryptographic hash function comprises a SHA-256 cryptographic hash algorithm, and wherein the hash tree comprises a ternary hash tree.

Example 45 includes the subject matter of any of Examples 39-44, and wherein hashing each of the plurality of chunks with the corresponding attribute that affects security comprises hashing each of the plurality of chunks with a corresponding load address, a corresponding page permission, or a corresponding page type.

Example 46 includes the subject matter of any of Examples 39-45, and wherein generating the initial secure enclave memory image comprises generating an initial secure enclave memory image that includes the hash tree.

Example 47 includes the subject matter of any of Examples 39-46, and wherein generating the initial secure enclave memory image comprises generating an initial secure enclave memory image that includes an enclave entry point, wherein the enclave entry point is to access a first chunk of the plurality of chunks in response to execution of the enclave entry point.

Example 48 includes the subject matter of any of Examples 39-47, and wherein generating the initial secure enclave memory image comprises generating an initial secure enclave memory image that includes an enclave exception handler, wherein the enclave exception handler is to verify a first chunk of the plurality of chunks based on the hash tree.

Example 49 includes a computing device comprising a processor; and a memory having stored therein a plurality of instructions that when executed by the processor cause the computing device to perform the method of any of Examples 25-48.

Example 50 includes one or more machine readable storage media comprising a plurality of instructions stored thereon that in response to being executed result in a computing device performing the method of any of Examples 25-48.

Example 51 includes a computing device comprising means for performing the method of any of Examples 25-48.

Example 52 includes a computing device for secure enclave execution, the computing device comprising means for executing an enclave entry point within a secure enclave, wherein the secure enclave is established with secure enclave support of a processor of the computing device, and wherein the enclave entry point is associated with an executable image that is divided into a plurality of chunks; means for accessing, in response to executing the enclave entry point, a first chunk of the executable image, wherein the first chunk is not loaded in the secure enclave; means for generating a page fault in response to accessing the first chunk of the executable image; means for verifying, by the secure enclave in response to generating the page fault, the first chunk based on a hash tree, wherein the hash tree includes a plurality of leaf nodes and a root value, wherein each of the plurality of leaf nodes corresponds to a hash value corresponding to a chunk of the executable image, and wherein the root value is integrity-protected; and means for accepting the first chunk of the executable image into the secure enclave in response to verifying the first chunk.

Example 53 includes the subject matter of Example 52, and wherein each of the plurality of chunks comprises a memory page.

Example 54 includes the subject matter of any of Examples 52 and 53, and wherein each of the plurality of chunks comprises a linked module of the executable image.

Example 55 includes the subject matter of any of Examples 52-54, and wherein the means for verifying the first chunk based on the hash tree comprises means for hashing the first chunk with a corresponding attribute that affects security to generate a first hash value; means for determining a test root value as a function of the hash tree and the first hash value; and means for comparing the test root value to the root value of the hash tree.

Example 56 includes the subject matter of any of Examples 52-55, and wherein the means for hashing the first chunk with the corresponding attribute comprises means for hashing the first chunk with the corresponding attribute using a cryptographic hash function.

Example 57 includes the subject matter of any of Examples 52-56, and wherein the cryptographic hash function comprises a SHA-256 cryptographic hash algorithm, and wherein the hash tree comprises a ternary hash tree.

Example 58 includes the subject matter of any of Examples 52-57, and wherein the means for hashing the first chunk with the corresponding attribute that affects security comprises means for hashing the first chunk with a load address of the first chunk, a page permission of the first chunk, or a page type of the first chunk.

Example 59 includes the subject matter of any of Examples 52-58, and further comprising means for loading an initial secure enclave memory image associated with the executable image into the secure enclave, wherein the initial secure enclave memory image includes the root value of the hash tree, and wherein the root value of the hash tree is integrity-protected by the secure enclave.

Example 60 includes the subject matter of any of Examples 52-59, and wherein the initial secure enclave memory image includes the enclave entry point.

Example 61 includes the subject matter of any of Examples 52-60, and further comprising means for executing an operating system page fault handler of the computing device in response to generating the page fault; and means for invoking an exception handler within the secure enclave in response to executing the operating system page fault handler; wherein the means for verifying the first chunk based on the hash tree comprises means for verifying the first chunk based on the hash tree in response to invoking the exception handler within the secure enclave.

Example 62 includes the subject matter of any of Examples 52-61, and further comprising means for determining a location of the first chunk in response to executing the operating system page fault handler; wherein the means for invoking the exception handler comprises means for invoking the exception handler with the location of the first chunk.

Example 63 includes the subject matter of any of Examples 52-62, and further comprising means for copying the first chunk to a secure buffer within the secure enclave in response to generating the page fault; wherein the means for verifying the first chunk based on the hash tree comprises means for verifying the first chunk in response to copying the first chunk to the secure buffer.

Example 64 includes the subject matter of any of Examples 52-63, and further comprising means for applying relocation to the secure buffer in response to verifying the first chunk.

Example 65 includes the subject matter of any of Examples 52-64, and wherein the means for accepting the first chunk of the executable image comprises means for copying the secure buffer to a corresponding load address within the secure enclave.

Example 66 includes a computing device for secure enclave generation, the computing device comprising means for dividing an executable image into a plurality of chunks; means for hashing each of the plurality of chunks to generate a corresponding hash value; means for generating a hash tree as a function of the plurality of hash values corresponding to the plurality of chunks, wherein the hash tree includes a plurality of leaf nodes and a root value, and wherein each of the plurality of leaf nodes corresponds to a hash value corresponding to a chunk; and means for generating an initial secure enclave memory image for the executable image, wherein the initial secure enclave memory image includes the root value of the hash tree.

Example 67 includes the subject matter of Example 66, and wherein each of the plurality of chunks comprises a memory page.

Example 68 includes the subject matter of any of Examples 66 and 67, and wherein each of the plurality of chunks comprises a linked module of the executable image.

Example 69 includes the subject matter of any of Examples 66-68, and wherein the means for hashing each of the plurality of chunks comprises means for hashing each of the plurality of chunks with a corresponding attribute that affects security.

Example 70 includes the subject matter of any of Examples 66-69, and wherein the means for hashing each of the plurality of chunks with the corresponding attribute comprises means for hashing each of the plurality of chunks with the corresponding attribute using a cryptographic hash function.

Example 71 includes the subject matter of any of Examples 66-70, and wherein the cryptographic hash function comprises a SHA-256 cryptographic hash algorithm, and wherein the hash tree comprises a ternary hash tree.

Example 72 includes the subject matter of any of Examples 66-71, and wherein the means for hashing each of the plurality of chunks with the corresponding attribute that affects security comprises means for hashing each of the plurality of chunks with a corresponding load address, a corresponding page permission, or a corresponding page type.

Example 73 includes the subject matter of any of Examples 66-72, and wherein the means for generating the initial secure enclave memory image comprises means for generating an initial secure enclave memory image that includes the hash tree.

Example 74 includes the subject matter of any of Examples 66-73, and wherein the means for generating the initial secure enclave memory image comprises means for generating an initial secure enclave memory image that includes an enclave entry point, wherein the enclave entry point is to access a first chunk of the plurality of chunks in response to execution of the enclave entry point.

Example 75 includes the subject matter of any of Examples 66-74, and wherein the means for generating the initial secure enclave memory image comprises means for generating an initial secure enclave memory image that includes an enclave exception handler, wherein the enclave exception handler is to verify a first chunk of the plurality of chunks based on the hash tree.

The invention claimed is:

1. A computing device for secure enclave execution, the computing device comprising:
   a secure execution module to (i) execute an enclave entry point that is loaded within a secure enclave, wherein the secure enclave comprises a trusted execution environment that is established with secure enclave support of a processor of the computing device, and wherein the enclave entry point is associated with an executable image that is divided into a plurality of chunks, and (ii) access, in response to execution of the enclave entry point, a first virtual memory location within the secure enclave that is assigned to a first chunk of the executable image, wherein the first chunk is not loaded in the secure enclave;

a memory management module to generate a page fault in response to the access of the first virtual memory location assigned to the first chunk of the executable image; and a secure loader module to (i) invoke an exception handler within the secure enclave in response to generation of the page fault, (ii) copy the first chunk to a secure buffer within the secure enclave in response to generation of the page fault, (iii) verify, by the secure enclave in response to invocation of the exception handler and in response to copying of the first chunk to the secure buffer, the first chunk based on a hash tree, wherein the hash tree includes a plurality of leaf nodes and a root value, wherein each of the plurality of leaf nodes corresponds to a hash value corresponding to a chunk of the executable image, and wherein the root value is integrity-protected and (iv) accept the first chunk of the executable image into the secure enclave in response to successful verification of the first chunk, wherein to accept the first chunk comprises to allow execution of the first chunk by the secure enclave support of the processor.

2. The computing device of claim 1, wherein to verify the first chunk based on the hash tree comprises to:

hash the first chunk with a corresponding attribute that affects security to generate a first hash value;

determine a test root value as a function of the hash tree and the first hash value; and compare the test root value to the root value of the hash tree.

3. The computing device of claim 2, wherein to hash the first chunk with the corresponding attribute comprises to hash the first chunk and the corresponding attribute with a cryptographic hash function.

4. The computing device of claim 3, wherein the cryptographic hash function comprises a SHA-256 cryptographic hash algorithm, and wherein the hash tree comprises a ternary hash tree.

5. The computing device of claim 2, wherein the corresponding attribute that affects security comprises a load address of the first chunk, a page permission of the first chunk, or a page type of the first chunk.

6. The computing device of claim 1, wherein the secure execution module is further to load an initial secure enclave memory image associated with the executable image into the secure enclave, wherein the initial secure enclave memory image includes the root value of the hash tree, and wherein the root value of the hash tree is integrity-protected by the secure enclave.

7. The computing device of claim 1, wherein:

the memory management module is further to (i) execute an operating system page fault handler of the computing device in response to generation of the page fault and (ii) invoke the exception handler within the secure enclave in response to execution of the operating system page fault handler.

8. The computing device of claim 1, wherein to accept the first chunk of the executable image comprises to copy the secure buffer to a corresponding load address within the secure enclave.

9. One or more non-transitory, computer-readable storage media comprising a plurality of instructions that in response to being executed cause a computing device to:

execute an enclave entry point that is loaded within a secure enclave, wherein the secure enclave comprises a trusted execution environment that is established with secure enclave support of a processor of the computing device, and wherein the enclave entry point is associated with an executable image that is divided into a plurality of chunks;

access, in response to executing the enclave entry point, a first virtual memory location within the secure enclave that is assigned to a first chunk of the executable image, wherein the first chunk is not loaded in the secure enclave;

generate a page fault in response to accessing the first virtual memory location assigned to the first chunk of the executable image;

invoke an exception handler within the secure enclave in response to generating the page fault;

copy the first chunk to a secure buffer within the secure enclave in response generating the page fault;

verify, by the secure enclave in response to invoking the exception handler and in response to copying the first chunk to the secure buffer, the first chunk based on a hash tree, wherein the hash tree includes a plurality of leaf nodes and a root value, wherein each of the plurality of leaf nodes corresponds to a hash value corresponding to a chunk of the executable image, and wherein the root value is integrity-protected; and accept the first chunk of the executable image into the secure enclave in response to successfully verifying the first chunk, wherein to accept the first chunk comprises to allow execution of the first chunk by the secure enclave support of the processor.

10. The one or more non-transitory, computer-readable storage media of claim 9, wherein to verify the first chunk based on the hash tree comprises to:

hash the first chunk with a corresponding attribute that affects security to generate a first hash value;

determine a test root value as a function of the hash tree and the first hash value; and compare the test root value to the root value of the hash tree.

11. The one or more non-transitory, computer-readable storage media of claim 10, wherein to hash the first chunk with the corresponding attribute that affects security comprises to hash the first chunk with a load address of the first chunk, a page permission of the first chunk, or a page type of the first chunk.

12. The one or more non-transitory, computer-readable storage media of claim 9, further comprising a plurality of instructions that in response to being executed cause the computing device to load an initial secure enclave memory image associated with the executable image into the secure enclave, wherein the initial secure enclave memory image includes the root value of the hash tree, and wherein the root value of the hash tree is integrity-protected by the secure enclave.

13. The one or more non-transitory, computer-readable storage media of claim 9, further comprising a plurality of instructions that in response to being executed cause the computing device to:

execute an operating system page fault handler of the computing device in response to generating the page fault; and invoke the exception handler within the secure enclave in response to executing the operating system page fault handler.

14. A computing device for secure enclave generation, the computing device comprising:
- a slice module to divide an executable image into a plurality of chunks;
- a hash module to (i) hash each of the plurality of chunks to generate a corresponding hash value and (ii) generate a hash tree as a function of the plurality of hash values corresponding to the plurality of chunks, wherein the hash tree includes a plurality of leaf nodes and a root value, and wherein each of the plurality of leaf nodes corresponds to a hash value corresponding to a chunk; and
- an output module to generate an initial secure enclave memory image for the executable image, wherein the initial secure enclave memory image includes the root value of the hash tree, an enclave entry point, and an enclave exception handler;
- wherein the enclave entry point is to access a first chunk of the plurality of chunks in response to execution of the enclave entry point; and
- wherein the enclave exception handler is to (i) copy the first chunk to a secure buffer within the secure enclave in response to an access of the first chunk, and (ii) verify the first chunk of the plurality of chunks based on the hash tree in response to copying of the first chunk to the secure buffer.

15. The computing device of claim 14, wherein to hash each of the plurality of chunks comprises to hash each of the plurality of chunks with a corresponding attribute that affects security.

16. The computing device of claim 14, wherein to generate the initial secure enclave memory image comprises to generate an initial secure enclave memory image that includes the hash tree.

17. One or more non-transitory, computer-readable storage media comprising a plurality of instructions that in response to being executed cause a computing device to:
- divide an executable image into a plurality of chunks;
- hash each of the plurality of chunks to generate a corresponding hash value;
- generate a hash tree as a function of plurality of hash values corresponding to the plurality of chunks, wherein the hash tree includes a plurality of leaf nodes and a root value, and wherein each of the plurality of leaf nodes corresponds to a hash value corresponding to a chunk; and
- generate an initial secure enclave memory image for the executable image, wherein the initial secure enclave memory image includes the root value of the hash tree, an enclave entry point, and an enclave exception handler;
- wherein the enclave entry point is to access a first chunk of the plurality of chunks in response to execution of the enclave entry point; and
- wherein the enclave exception handler is to (i) copy the first chunk to a secure buffer within the secure enclave in response to an access of the first chunk, and (ii) verify the first chunk of the plurality of chunks based on the hash tree in response to copying of the first chunk to the secure buffer.

18. The one or more non-transitory, computer-readable storage media of claim 17, wherein to hash each of the plurality of chunks comprises to hash each of the plurality of chunks with a corresponding attribute that affects security.

19. The one or more non-transitory, computer-readable storage media of claim 17, wherein to generate the initial secure enclave memory image comprises to generate an initial secure enclave memory image that includes the hash tree.

* * * * *